(12) United States Patent
Ido

(10) Patent No.: US 9,115,849 B2
(45) Date of Patent: Aug. 25, 2015

(54) ALARM MAT

(75) Inventor: Mineo Ido, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 442 days.

(21) Appl. No.: 13/589,854

(22) Filed: Aug. 20, 2012

(65) Prior Publication Data

US 2014/0048009 A1    Feb. 20, 2014

(51) Int. Cl.
| | | |
|---|---|---|
| *G08B 13/10* | (2006.01) | |
| *F16P 3/12* | (2006.01) | |
| *A63B 5/00* | (2006.01) | |
| *G08B 21/02* | (2006.01) | |
| *G08B 3/06* | (2006.01) | |

(52) U.S. Cl.
CPC ... *F16P 3/12* (2013.01); *A63B 5/00* (2013.01); *G08B 3/06* (2013.01); *G08B 13/10* (2013.01); *G08B 21/02* (2013.01)

(58) Field of Classification Search
CPC .......... G08B 21/02; G08B 13/10; G08B 3/06; A63B 5/00; F16P 3/12
USPC ............................ 116/1, 98, 75, 139; 473/414
See application file for complete search history.

(56) References Cited

U.S. PATENT DOCUMENTS

| | | | | |
|---|---|---|---|---|
| 953,224 | A * | 3/1910 | O'Connell | 116/1 |
| 2,238,035 | A * | 4/1941 | Char | 446/193 |
| 2,712,201 | A * | 7/1955 | Wintriss | 446/184 |
| 3,091,454 | A * | 5/1963 | Sam | 473/414 |
| 3,747,233 | A * | 7/1973 | Berryman | 434/255 |
| 3,927,880 | A * | 12/1975 | Petrusek | 273/138.2 |
| 4,848,743 | A * | 7/1989 | Rozek | 473/414 |
| 5,546,075 | A * | 8/1996 | Shimoji | 340/666 |
| 5,592,689 | A * | 1/1997 | Matthews | 2/23 |
| 5,841,368 | A * | 11/1998 | Bryant | 340/932.2 |
| 6,854,163 | B1 * | 2/2005 | Ruana | 16/431 |
| 8,122,843 | B2 * | 2/2012 | Lindsay et al. | 116/139 |

FOREIGN PATENT DOCUMENTS

| | | |
|---|---|---|
| JP | 2751659 B2 | 5/1998 |
| JP | 2903854 B2 | 6/1999 |
| JP | 3102048 U | 6/2004 |

OTHER PUBLICATIONS

Derwent Abstract, 2012-E78007, abstract of JP 2012084840A, published Apr. 26, 2012, title "Warning mat for floor surface of e.g. factory, has whistle that is inserted into the corresponding opening at edge of each protrusion to emit sound by inflow and outflow of air into opening".*

* cited by examiner

*Primary Examiner* — R. A. Smith
*Assistant Examiner* — Tania Courson
(74) *Attorney, Agent, or Firm* — McDermott Will & Emery LLP

(57) ABSTRACT

An alarm mat includes a sheet, and sound producer from which sound is produced by air inflow and outflow. The sheet is provided with a plurality of projections made of an elastic material, projecting toward an upper-surface side of the sheet with top portions thereof continuously extending, and each having a sealed cavity inside. The plurality of projections are juxtaposed to each other. The sound producer is loaded in the sheet in a manner that air flows in and out of the projections through the sound producer alone.

3 Claims, 5 Drawing Sheets

F I G. 3
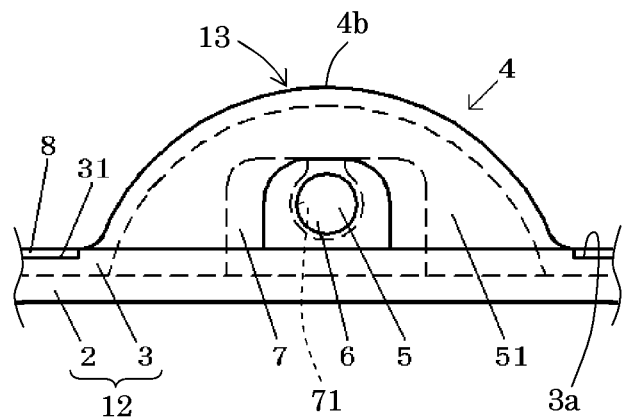
F I G. 4
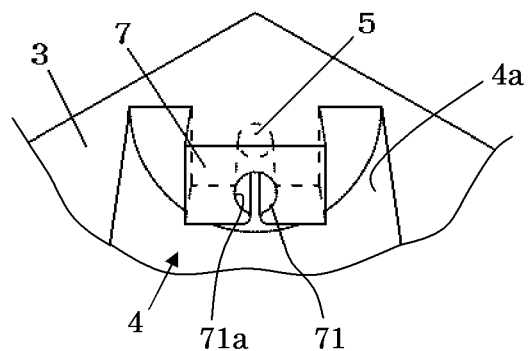
F I G. 5
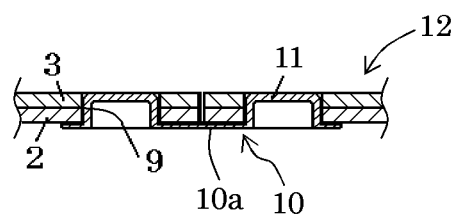

F I G.10
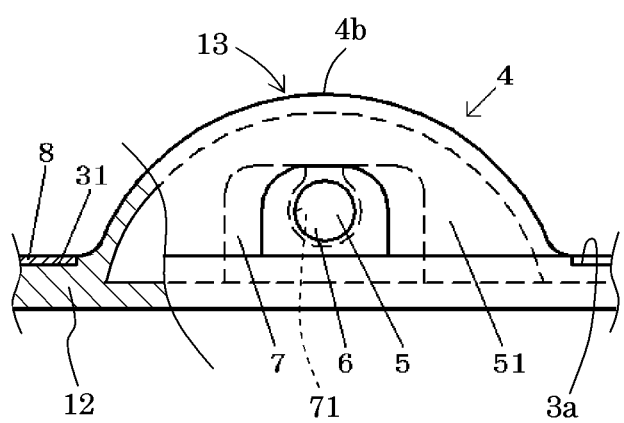

ALARM MAT

BACKGROUND OF THE INVENTION

1. Field of the Invention

The invention relates to an alarm mat laid on a floor surrounding a dangerous area not to be accessed in, for example, plants and construction sites.

2. Description of the Related Art

Japan Patent No. 2751659 (hereinafter, called prior art 1) discloses an alarm mat provided with a large number of semispherical projections provided on a base plate including a plywood board, sealed tubular members formed in a bellows-like shape in cavities of the projections, and whistles sounded by air inflow and outflow to and from the sealed tubular members. This alarm mat needs no power supply.

Japan Patent No. 2903854 (hereinafter, called prior art 2) discloses an alarm mat provided with a large number of semispherical projections elastically deformable and provided on a base plate including a plywood board, sealed tubular members formed in the projections, whistles sounded by the deformation of the sealed tubular members, and a protective member surrounding lower parts of the sealed tubular members. This alarm mat too needs no power supply.

Japan Utility Model Registration No. 3102048 (hereinafter, called prior art 3) discloses an alarm mat having an elastic plate having cavities and through holes formed therein, air-permeable sponges filling the cavities, and reed whistles fitted in the through holes.

The prior arts 1 and 2, wherein it is necessary to set the sealed tubular members and the whistles in a large number of projections, requires extensive man-hours during the production of these mats, leading to a time-consuming production process and large production costs. According to the prior art 3, a degree of elastic deformation when the alarm mat is stepped on by foot is rather small as compared to a large volume in total of the cavities formed in the elastic plate. This structural disadvantage involves the risk that airflow leaking from the cavities through the whistles is possibly too weak to make the whistles produce sound. The prior art 3 has another disadvantage that the elastic plate where the cavities are formed has a large area. Such a large plate, when stepped on by foot, does not immediately regain its original shape, therefore, there are times when the whistles fail to produce sound.

SUMMARY OF THE INVENTION

To solve these conventional technical problems, the invention provides a non-electric alarm mat producible with less production costs than the conventional products, wherein it is ensured that sound producers produce sound.

An alarm mat according to the invention includes a sheet, and sound producer from which sound is produced by air inflow and outflow, wherein the sheet is provided with a plurality of projections made of an elastic material, projecting toward an upper-surface side of the sheet with top portions thereof continuously extending, and each having a sealed cavity inside, the plurality of projections are juxtaposed to each other, and the sound producer is held in ends of the projections on at least one of both sides in a longitudinal direction thereof in a manner that air flows in and out of the projections through the sound producers alone.

Preferably, the projections each has an arc shape in cross section along a direction orthogonal to the longitudinal direction thereof, and the projections are disposed in juxtaposition and equally spaced from each other. To ensure that the sound producers produce sound, an interval between the projections next to each other is preferably smaller than an average foot length.

Preferably, the sheet includes a medium having a plate shape and a cover sheet made of an elastic material and formed on an upper surface of the medium, wherein the projections each includes a projection body provided in the cover sheet and the medium, the projection bodies each having a dented inside are projecting toward the upper-surface side of the sheet, the medium is adhered to a lower surface of the cover sheet to seal the projection bodies, at least one of both ends of the projection bodies each in the longitudinal direction has an opening communicating inside of the projection body with outside, the sound producer has an air inflow/outflow port, the cover sheet has holders therein to hold the sound producer, and the holders each holds the sound producer in a manner that the air inflow/outflow port thereof faces the opening and inward of the projection.

Preferably, the sheet has a rectangular shape, and the plurality of projections are disposed in parallel with a diagonal line of the sheet.

Preferably, one of the plurality of projections is provided on a diagonal line of the sheet.

Preferably, an upper surface cover member colored differently to the cover sheet is provided on a surface of the cover sheet located between the plurality of projections.

Preferably, the sheet has a fitting hole formed to fit therein a joint member used to join the alarm mats.

Preferably, the holders are formed integral with the projection bodies.

According to the alarm mat provided by the invention, when any of the projections is stepped on by foot, the projection is compressed and deformed, and air inside of the projection flows out. At the time, the sound producer produces sound. Once the foot is removed from the projection, the projection compressed and deformed is immediately elastically restored, which introduces air into the projection. Then, the sound producer produces sound again. When the alarm mat is stepped on continuously, the projection is accordingly compressed and deformed, and the sound producer keeps producing sound. The invention, wherein number of structural elements is largely reduced than the prior art products, can easily produce the alarm mat and reduces production and maintenance costs.

According to the alarm mat wherein the holders are provided, the holders prevent the sound producers from being crushed by the foot placed on edges of the projections where the sound producers are provided. According to the alarm mat wherein the upper surface cover member is colored differently to the cover sheet, an area of danger is more visually noticeable.

The invention is suitably applied to an alarm mat laid on the near side of a restricted area and/or a floor surface around the area in, for example, plants and construction sites. The invention provides an alarm mat technically advantageous in that an alarm sound is emitted when a person places his foot on the mat to prevent him/her from entering the restricted area.

BRIEF DESCRIPTION OF THE DRAWINGS

These and other objects as well as advantages of the invention will become clear by the following description of an exemplary embodiment of the invention. A number of benefits not recited in this specification will come to the attention of the skilled in the art upon the implementation of the present invention.

FIG. 3 is an enlarged view of a part circled with a dotted line in FIG. 2.

FIG. 4 is a perspective view of a holder according to the invention vertically reversed.

FIG. 5 is a schematic illustration of two alarm mats according to the invention joined with each other.

FIG. 10 is a sectional view of an alarm mat according to a modified example of the invention.

DETAILED DESCRIPTION OF THE INVENTION

Figure 1:
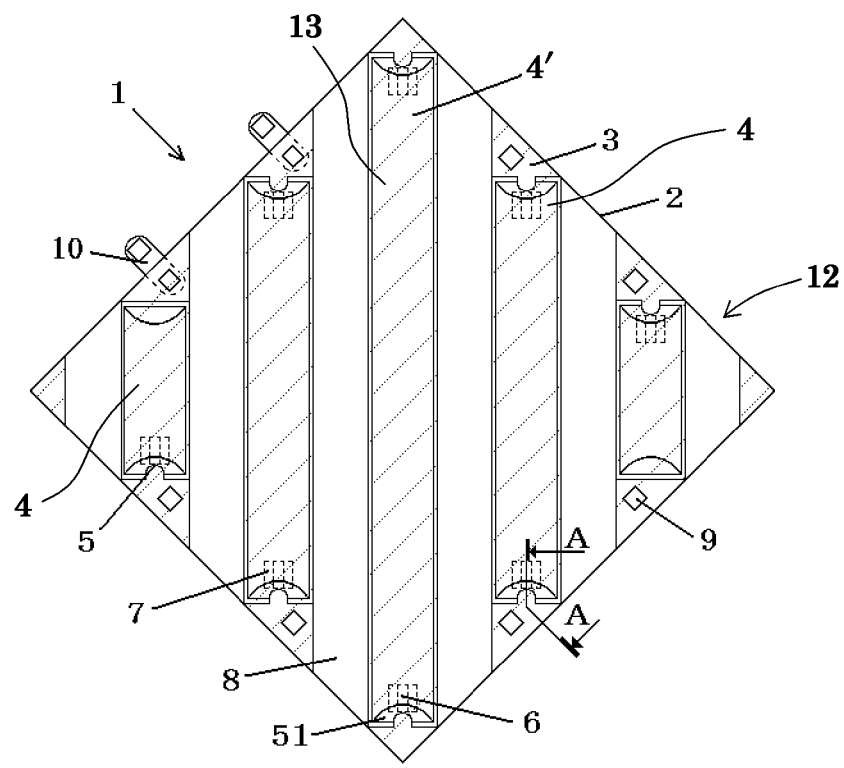
FIG. 1 is a planar view of an alarm mat according to the invention.
Figure 2:
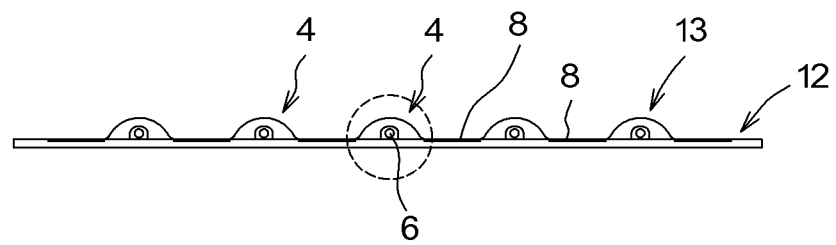
FIG. 2 is a front view of the alarm mat according to the invention.

Hereinafter, an exemplary embodiment of the invention is described in detail referring to the drawings. FIGS. 1 and 2 are planar and front views of an alarm mat 1 according to an exemplary embodiment of the invention. Referring to these drawings, the alarm mat 1 has a medium 2 having a flat and rectangular plate shape and made of an elastic material such as a rubber material or a synthetic resin. An area of the medium 2 from a side surface to an upper surface thereof is covered with a cover sheet 3 made of a rubber material or a synthetic resin more flexible than the material of the medium 2. The cover sheet 3 is adhered to the medium 2 with a double stick tape or an adhesive. The medium 2 and the cover sheet 3 constitute a sheet 12.

The cover sheet 3 has a plurality of semi-cylindrical projection bodies 4 each having a dented inside and projecting toward an upper-surface side of the sheet. The cover sheet 3 and the projection bodies 4 are integrally formed. The projection bodies 4 are each formed in a bulged shape having an opening 4a in a lower section thereof, and top portions of the projection bodies 4 are continuously extending in a linear manner. The projection bodies 4 are spaced at equal intervals. When the cover sheet 3 is adhered to a lower surface of the medium 2, the lower openings 4a of the projection bodies 4 are blocked by the medium 2 so that the projection bodies 4 are air-tightly sealed. According to the exemplary embodiment, the projection bodies 4 and the medium 2 blocking the lower openings 4a constitute projections 13. As illustrated in FIG. 10, the medium 2 and the cover sheet 3 may be formed integral with each other.

The plurality of projection bodies 4 are formed in a semi-cylindrical shape. This shape moderately scatters a pressing force applied to the projection body 4 when stepped on by foot, thereby preventing the projection body 4 from being overly deformed. The semi-cylindrical shape is an example of linearly continuous bulge shapes having an arc shape in cross section when cut along a direction orthogonal to a longitudinal direction of the projection body 4. The projection body 4 formed in such a shape is elastically restored immediately after the foot is removed therefrom, in other words, when the pressing force is released therefrom.

A projection body 4', which is one of the projection bodies 4, is provided on a diagonal line of the rectangular medium 2, and any other projection bodies 4 are provided in parallel with the projection body 4' with given intervals therebetween. A flat portion 3a of the cover sheet 3 between the projection bodies 4 adjacent to each other is coated with an upper surface cover member 8 having a flat shape and elastically deformable. The upper surface cover members 8 are fitted in grooves 31 formed in the flat portions 3a of the cover sheet 3. The upper surface cover members 8 are colored differently to the cover sheet 3.

Figure 6:
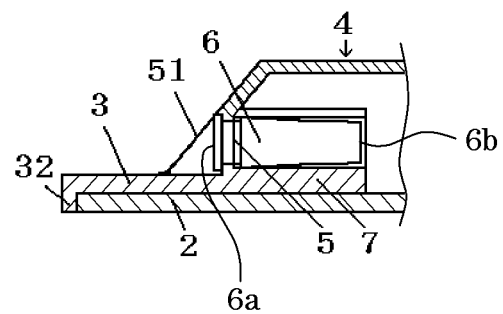
FIG. 6 is an enlarged view of the illustration of FIG. 1 cut along A-A.

FIGS. 3 and 6 are enlarged views of an end portion 51 of the projection body 4 and a surrounding area thereof. As illustrated in these drawings, a peripheral edge part 32 of the cover sheet 3 extends to an outer side of the medium 2 to cover a peripheral edge of the medium 2. This increases adhesiveness between the medium 2 and the cover sheet 3, thereby preventing any leakage of air therethrough. At least one of the end portions 51 of the projection body 4 on both sides in a longitudinal direction thereof has an opening 5 communicating inside of the sealed projection body 4 with outside. The opening 5 has a whistle 6 fitted therein, and the whistle 6 is sounded by air inflow and outflow. The whistle 6 is a sound producer from which sound is produced by air inflow and outflow. The sound producer according to the invention is not necessarily limited to the whistle 6 but may employ any other form as far as it produces sound whenever air flows in and out.

Hereinafter, structural characteristics for mounting the whistles 6 are described. The cover sheet 3 is provided with holders 7. The holder 7 is provided on an inner side of the projection body 4 adjacent to the opening 5 at the end portion 51. The holder 7 is formed integral with the projection body 4. The holder 7 has a C-shape groove 71. The C-shape groove 71 has a groove 71a formed continuous to the opening 5. The groove 71a has a shape almost equal to an outer-diametrical shape of the whistle 6 (cylindrical shape). The whistle 6 is detachably retained in the C-shape groove 71 by elastic deformation of the holder 7. An air inflow/outflow port is provided in each of ends 6a and 6b of the whistle 6. The whistle 6 is fitted in the C-shape groove 71 with the end 6a (one of the air inflow/outflow ports) facing the opening 5 (outer side of the projection body 4) and the end 6b (the other one of the air inflow/outflow ports) facing inside of the projection body 4. When the whistle 6 is thus fitted, an internal space of the projection body 4 sealed by the medium 2 communicates with an outside space through the whistle 6 alone. The holder 7 protects the whistle 6 so that such an excessive pressing force that may crush the whistle 6 is not applied thereto when a person steps on the end portion 51 and the whistle 6.

When a person steps on the projection body 4, the projection body 4 is thereby compressed and deformed, and air outflows from the projection body 4. Because of the structural feather that air can only outflow from the projection body 4 through the whistle 6 alone, the whistle 6 is sounded by the outflow of air. As soon as the foot placed on the projection body 4 is removed therefrom, the projection body 4 is elastically restored, and air flows into the projection body 4. Then, the whistle 6 is sounded by the inflow of air. When a person's foot is repeatedly placed on and released from the projection body 4 thus capable of swiftly restoring its original shape, the whistle 6 accordingly produces sound. In other words, the air inflow and outflow reliably occurs whenever a person's foot is repeatedly placed on and released from the projection body 4. Though the whistle 6 described so far is sounded by the air inflow and outflow to and from the projection body 4, the whistle 6 according to the invention may be sounded by at least one of the air inflow and the air outflow.

When a person places his foot on the alarm mat 1, its tiptoe possibly gets caught in the end portion 51, making the person trip over. To prevent such an accident, the end portions 51 are all formed with a tilt. A center part of the end portion 51 is dented inward so that the tiptoe does not directly contact the whistle 6, and the opening 5 is provided in a rearward part of the dented center part of the end portion 51. According to the exemplary embodiment, the end portions 51 are tilting through about 50 degrees from a horizontal plane except for the dented parts thereof.

Figure 7A:
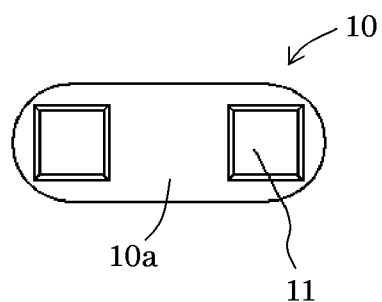
FIG. 7A is a planar view of a joint member used to join the alarm mats according to the invention.
Figure 7B:
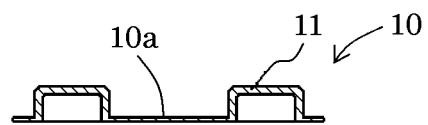
FIG. 7B is a sectional view of a joint member used to join the alarm mats according to the invention.

Below is described a structure where the alarm mats 1 adjacently disposed are joined. As illustrated in FIGS. 7A and 7B, joint members 10 are used to join the alarm mats 1. The joint member 10 is made of an elastic material such as a rubber material or a synthetic resin. The joint member 10 includes a joint plate 10a where a pair of joint projections 11 is formed. The joint projections 11 are formed on a surface of the joint plate 10a. The pair of joint projections 11 are spaced from each other with a given interval therebetween.

The sheet 12 has fitting holes 9 formed therein; two each in four sides of the cover sheet 3, eight fitting holes in total. The fitting holes are formed so as to penetrate through the medium 2 and the cover sheet 3. The fitting holes 9 are formed in a shape that is almost equal to that of the joint projections 11 so that the joint projections 11 of the joint member 10 can be fitted in the holes. An interval between each side of the cover sheet 3 and the fitting hole 9 is about half of an interval between the joint projections 11 in the joint member 10. When the joint projections 11 of the joint member 10 are fitted in the fitting holes 9 of the alarm mats 1 placed next to each other, the alarm mats 1 are joined with each other by the joint members 10.

Figure 8:
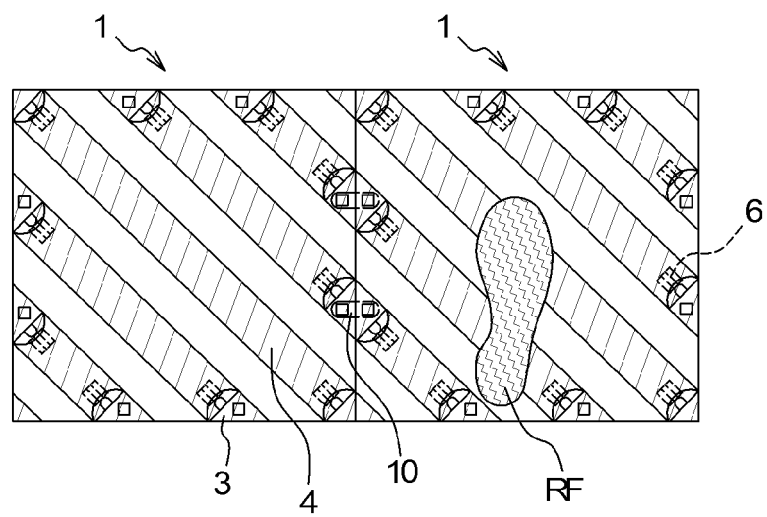
FIG. 8 is a planar view of an exemplary embodiment wherein two alarm mats according to the invention are joined with each other.
Figure 9:
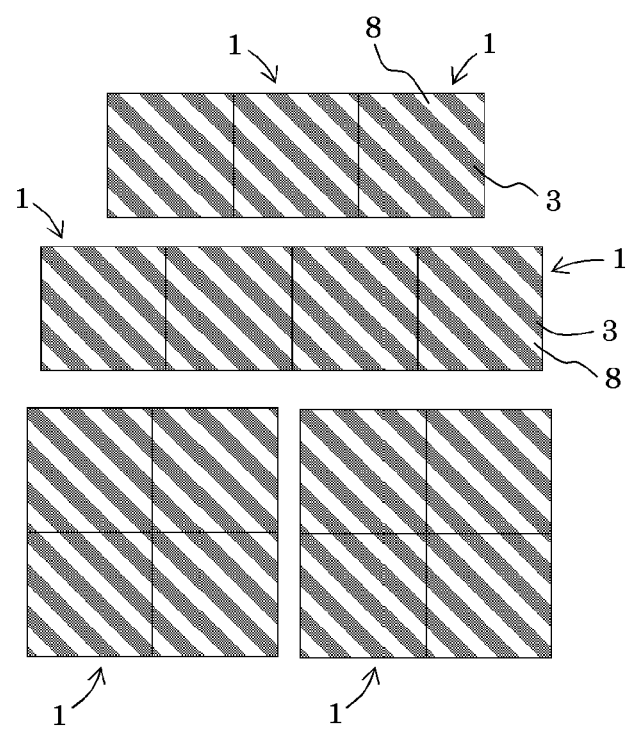
FIG. 9 is a planar view of an exemplary embodiment wherein multiple alarm mats according to the invention are joined with one other.

FIG. 5 is a schematic illustration of the alarm mats 1 joined with each other by the joint member 10. FIG. 8 illustrates an example where two mats 1 are joined, and FIG. 9 illustrates an example where at least three alarm mats 1 are joined. FIG. 8 further illustrates a state where a person places his right foot RF on the alarm mat 1 joined with another alarm mat 1. Describing a process of joining the alarm mats 1, the joint projection 11 on one side of the joint member 10 is fitted in the fitting hole 9 of one of the mats 1 vertically upward from therebelow, and the joint projection 11 on the other side of the joint member 10 is fitted in the fitting hole 9 of the other alarm mat 1 vertically upward from therebelow.

To attach the cover sheet 3 to the medium 2 and also attach the cover sheet 3 to the upper surface cover members 8, the exemplary embodiment uses a double tick tape or an adhesive in place of such fastening parts as bolts or nuts. The mat thus structurally simplified can be easily manufactured.

Next, an assembling process of the alarm mat 1 is described. First, the medium 2 is molded by a conventional molding method. Then, the cover sheet 3 and the holders 7 are integrally molded by conventional compression molding. The cover sheet 3 and the holders 7 are integrally molded so that bottom surfaces of the cover sheet 3 and the holders 7 are flush with each other. This firmly and also easily attach the cover sheet 3 to the medium 2 and bond the holders 7 to the medium 2. Thus arranged, the bottom surfaces of the holders 7 tightly adheres to the medium 2, eliminating the risk that any of the holders 7 is displaced from their original positions when a section of the mat near the end portion 51 is stepped on by foot. The openings 5 are formed when the cover sheet 3 is formed.

The whistles 6 are pushed into the mat from its left side to right side in the illustration of FIG. 6 to be fitted in the C-shape grooves 71 from the outer side of the projection bodies 4. The whistles 6 are fitted in the grooves so that the ends 6a of the whistles 6 face the openings 5 and the ends 6b thereof face inward of the projections 4. After the whistles 6 are fitted in the grooves, the cover sheet 3 and the medium 2 are attached to each other with a double stick tape or an adhesive.

After the cover sheet 3 and the medium 2 are attached to each other, the fitting holes 9 are formed in the cover sheet 3 and the medium 2, and the upper surface cover members 8 are attached to the grooves 31 of the cover sheet 3. According to the exemplary embodiment, notches are formed in parts where the fitting holes 9 are formed during the production of the medium 2 and the cover sheet 3, so that the fitting holes 9 are easily manually formed (with finger) after the cover sheet 3 and the medium 2 are attached to each other. In place of forming the notches, parts constituting the fitting holes 9 may be formed by very thinly leaving the bonded surfaces alone in the form of grooves during the production of the medium 2 and the cover sheet 3, so that the fitting holes 9 are easily manually formed (with finger). The fitting holes 9 may be formed during the production of the medium 2 and the cover sheet 3 or may be formed by, for example, a drilling tool after the cover sheet 3 and the medium 2 are attached to each other.

The exemplary embodiment provides the projection body 4' of the projection bodies 4 on the diagonal line of the medium 2 and aligns the other projection bodies 4 in parallel therewith. This provides the projection bodies 4 respectively having different internal capacities on the alarm mat 1. When, for example, the projection body 4' and the projection body 4 adjacent thereto are stepped on by foot at the same time, the whistles 6 provided in the projection bodies 4 and 4' respectively produce different sounds in volume and tone because of different quantities of air flowing in and out of the projection bodies 4 and 4'. This increases an alarming effect.

The upper surface cover members 8 colored differently to the cover sheet 3 are attached to the flat portions 3a between the adjacent projection bodies 4. Then, different patterns which are visually uniform on the whole can be provided when a number of alarm mats 1 are put together as illustrated in FIG. 9. For example, a combination of the cover sheet 3 colored in black and the upper surface cover members 8 colored in yellow makes a tiger-like pattern which effectively calls for attention, visually preventing anyone from entering a restricted area. The illustration of FIG. 9 omits the joint members and the fitting holes.

According to the exemplary embodiment, a double stick tape or an adhesive is used for adhesion of the medium 2 and the cover sheet 3 and adhesion of the cover sheet 3 and the upper surface cover members 8. Such an alarm mat necessitating no fastening parts, bolts or nuts, is structurally simplified and easily manufactured.

The alarm mat 1 needs not be fixated to a floor where the alarm mat 1 is laid with, for example, a double stick tape. The medium 2 made of a rubber material, for example, makes it unnecessary to fixate the alarm mat 1 to the floor because friction suitably generated between the alarm mat 1 and the floor makes it unlikely that the alarm mat 1 is displaced from an intended position. Further, such a rubber medium 2 can be used on any floors where adhesive tapes are not allowed to be used.

While there has been described what is at present considered to be an exemplary embodiment of this invention, it will be understood that various modifications may be made therein, and it is intended to cover in the appended claims all such modifications as fall within the true spirit and scope of this invention.

What is claimed is:

1. A mat, including:
a sheet having a rectangular shape; and
sound producer from which sound is produced by air inflow and outflow,
wherein the sheet is provided with a plurality of semi-cylindrical projections and a flat portion,
each of the projections is made of an elastic material, have a dented inside, and projects toward an upper-surface side of the sheet, the flat portion is formed to an upper-surface portion of the sheet other than the plurality of projections and is colored in a different color from the plurality of projections,
each of the plurality of projections has a continuous straight line shape extending substantially from one end of the sheet to another end of the sheet, with each end of a given projection of the plurality of projections extending linearly near a respective end portion of the sheet,
the plurality of projections are disposed in parallel with a diagonal line of the sheet and are spaced from each other with given intervals,
the sound producer is held in ends of the projections on at least one of both sides in a longitudinal direction thereof in a manner that air flows in and out of the projections through the sound producers alone,
the flat portion has fitting holes for fitting joint members for jointing mats on a location near the end portions of the sheet,
the sheet includes a medium having a plate shape and a cover sheet,
the cover sheet is made of elastic materials and is provided on the upper surface of the medium,
the projections have a projection body provided in the cover sheet and the medium,
the projection body is inclined so that both ends thereof are low outwardly and high inwardly and a central portion of each of the both ends is depressed inwardly,
the medium is adhered to a lower surface of the cover sheet to seal the projection body,
the projection body has an opening communicating inside and outside of the projections in at least one of both ends of the projection body in the longitudinal direction,
the sound producer has an air inflow/outflow port,
the cover sheet has holders therein to hold the sound producer,
the holders have a C-shape groove corresponding to the opening of the projection body,
the sound producer is held in the C-shape groove in a manner that the sound producer is accommodated in the C-shape groove, and
the holders are formed integrally within the projections upon forming the cover sheet.

2. The mat as claimed in claim 1, wherein one of the plurality of projections is provided on a diagonal line of the sheet.

3. The mat as claimed in claim 1, wherein one of the plurality of projections is provided on a diagonal line of the sheet.

* * * * *